US012225647B2

(12) United States Patent
Slivka et al.

(10) Patent No.: US 12,225,647 B2
(45) Date of Patent: *Feb. 11, 2025

(54) AUTO DIM AND COLOR ADJUSTING BACKLIGHT FOR A WALL MOUNTED CONTROL DEVICE

(71) Applicant: Crestron Electronics, Inc., Rockleigh, NJ (US)

(72) Inventors: Benjamin M. Slivka, Hillsalde, NJ (US); Dennis J. Hromin, Park Ridge, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 536 days.

This patent is subject to a terminal disclaimer.

(21) Appl. No.: 17/579,814

(22) Filed: Jan. 20, 2022

(65) Prior Publication Data

US 2022/0210890 A1 Jun. 30, 2022

Related U.S. Application Data

(63) Continuation of application No. 17/136,834, filed on Dec. 29, 2020, now Pat. No. 11,284,494.

(51) Int. Cl.

*H05B 47/11* (2020.01)
*H05B 45/10* (2020.01)
*H05B 45/20* (2020.01)
*H05B 47/175* (2020.01)

(52) U.S. Cl.

CPC ............. *H05B 47/11* (2020.01); *H05B 45/10* (2020.01); *H05B 45/20* (2020.01); *H05B 47/175* (2020.01)

(58) Field of Classification Search

None

See application file for complete search history.

(56) References Cited

U.S. PATENT DOCUMENTS 6,660,948 B2 12/2003 Clegg et al.
7,135,664 B2 11/2006 Vornsand et al.
7,361,853 B2 4/2008 Clegg et al.

(Continued)

OTHER PUBLICATIONS

Crestron CNX-BF12 & CNX-BN12, Designer Function & Numeric Keypads, Operations & Installation Guide, Doc. 8185A, 2006.

(Continued)

*Primary Examiner* — Crystal L Hammond

(74) *Attorney, Agent, or Firm* — Crestron Electronics, Inc.

(57) ABSTRACT

An apparatus, system, and method for an automatic dimming and color adjusting backlight LEDs of wall mounted control device buttons. The control device comprises a light sensor that detects light levels in a room where the control device is installed. The control device comprises a controller that operates the backlight LEDs according to day color setting when it receive a light level reading from the light sensor that is above a day/night threshold and according to a night color setting when it receives a light level reading from the light sensor that is below the day/night threshold. In addition, the controller dims the backlight LEDs based on the detected light level readings according an indication mode dimming curve when the backlight LEDs are in an indication mode and according to a backlight mode dimming curve when the backlight LEDs are in a backlight mode.

20 Claims, 11 Drawing Sheets

(56) References Cited

U.S. PATENT DOCUMENTS

| | | | |
|---|---|---|---|
| 7,432,460 B2 | 10/2008 | Clegg et al. | |
| 7,432,463 B2 | 10/2008 | Clegg et al. | |
| 7,667,170 B2 | 2/2010 | Jang et al. | |
| 7,825,891 B2 | 11/2010 | Yao et al. | |
| 8,031,164 B2 | 10/2011 | Herz et al. | |
| 8,102,375 B1 | 1/2012 | Feldstein | |
| 8,698,727 B2 | 4/2014 | Herz et al. | |
| 8,779,681 B2 | 7/2014 | Adler | |
| 9,513,739 B2 | 12/2016 | Herz et al. | |
| 9,763,302 B2 | 9/2017 | McDonald et al. | |
| 9,860,952 B2 | 1/2018 | Twaddel et al. | |
| 9,872,359 B2 | 1/2018 | Adler | |
| 9,980,335 B2 | 5/2018 | McDonald et al. | |
| 10,133,337 B2 | 11/2018 | Killo et al. | |
| 10,206,260 B2 | 2/2019 | McDonald et al. | |
| 10,212,777 B2 | 2/2019 | Twaddel et al. | |
| 10,225,902 B2 | 3/2019 | Chen | |
| 10,416,749 B2 | 9/2019 | Killo et al. | |
| 10,516,292 B2 | 12/2019 | Chen | |
| 10,660,185 B2 | 5/2020 | Baker et al. | |
| 11,284,494 B1 * | 3/2022 | Slivka | H05B 45/10 |
| 2006/0022951 A1 | 2/2006 | Hull | |
| 2007/0282522 A1 | 12/2007 | Geelen | |
| 2014/0167642 A1 | 6/2014 | Chobot | |
| 2015/0048758 A1 | 2/2015 | Carrigan et al. | |
| 2018/0136737 A1 | 5/2018 | Amarilio et al. | |

OTHER PUBLICATIONS

Crestron INET-CBD, Cameo® Wireless Keypads with infiNET™, Operations & Installation Guide, Doc. 6472D, 2014.

Crestron INETI-CB, Cameo® Keypads with infiNET™, Operations & Installation Guide, Doc. 6627D, 2014.

* cited by examiner

AUTO DIM AND COLOR ADJUSTING BACKLIGHT FOR A WALL MOUNTED CONTROL DEVICE

BACKGROUND OF THE INVENTION

Technical Field

Aspects of the embodiments relate to wall mounted control devices, and more specifically to an apparatus, system and method for an automatic dimming and color adjusting backlight for wall mounted control devices.

Background Art

The popularity of home and building automation has grown in recent years partially due to increases in affordability, improvements, simplicity, and a higher level of technical sophistication of the average end-user. Automation systems integrate various electrical and mechanical system elements within a building or a space, such as a residential home, commercial building, or individual rooms, such as meeting rooms, lecture halls, or the like. Examples of such system elements include heating, ventilation and air conditioning (HVAC), lighting control systems, audio and video (AV) switching and distribution, motorized window treatments (including blinds, shades, drapes, curtains, etc.), occupancy and/or lighting sensors, and/or motorized or hydraulic actuators, and security systems, to name a few.

One way a user can be given control of an automation system, is through the use of one or more control devices, such as keypads. A keypad is typically mounted in a recessed receptacle in a building wall, commonly known as a wall or a gang box, and comprises one or more buttons or keys each assigned to perform a predetermined or assigned function. Assigned functions may include, for example, turning various types of loads on or off, or sending other types of commands to the loads, for example, orchestrating various lighting presets or scenes of a lighting load.

Typically, the various buttons are printed with indicia to either identify their respective functions or the controlled loads. These buttons may include backlighting via light emitting diodes (LEDs). Giving the customer the ability to change backlight color of these buttons to any desired color or color temperature of white is an added feature. For example, different button backlight colors may be used for indication, to distinguish between buttons, load types (e.g., emergency load), or the load state (e.g., on or off), or button backlight colors may be chosen to complement the surroundings or to give a pleasing visual effect. This can be achieved via multicolor LEDs, such as Red-Green-Blue (RGB) LEDs, to produce different colored backlighting. Each RGB LED comprises red, green, and blue LED emitters in a single package. Almost any color can be produced by independently adjusting the intensities of each of the three RGB LED emitters. Backlight may be provided using a single color that changes in brightness based on ambient light levels in the room. Achieving optimal backlight brightness via dimming is preferred so the backlight is not too bright when the room is dark or too dim when the room is bright. If the backlight is too bright for the ambient light level it could be a nuisance or it could cause light bleed around buttons. However, while one color backlight may be pleasantly perceived during the day, the same color may be too bright or disturbing during the night. Additionally, some colors are more optimal in backlighting text during the day while others are more optimal in backlighting text during the night.

Accordingly, a need has arisen for an apparatus, system, and method for an automatic dimming and color adjusting backlight for wall mounted control device buttons.

SUMMARY OF THE INVENTION

It is an object of the embodiments to substantially solve at least the problems and/or disadvantages discussed above, and to provide at least one or more of the advantages described below.

It is therefore a general aspect of the embodiments to provide an apparatus, system, and method for an automatic dimming and color adjusting backlight for wall mounted control device buttons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
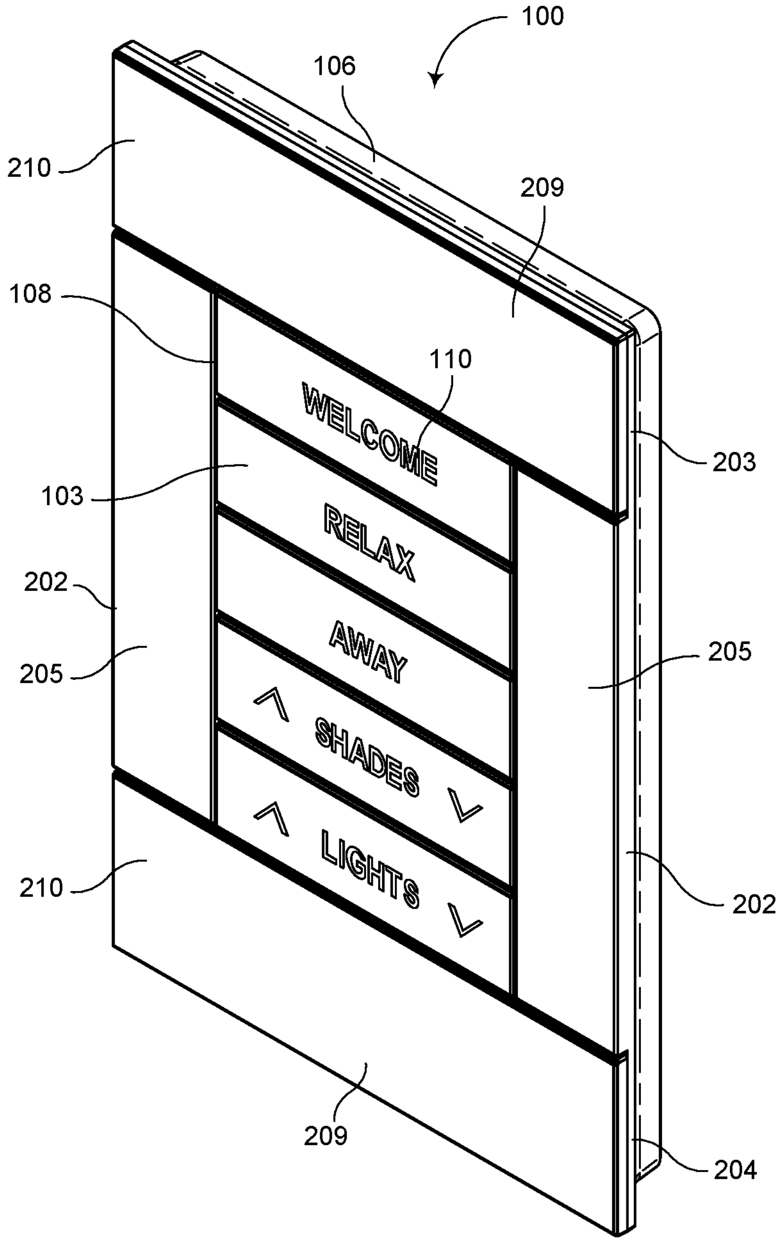

FIG. 1 illustrates a perspective front view of an illustrative wall mounted control device according to an illustrative embodiment.

Figure 2:
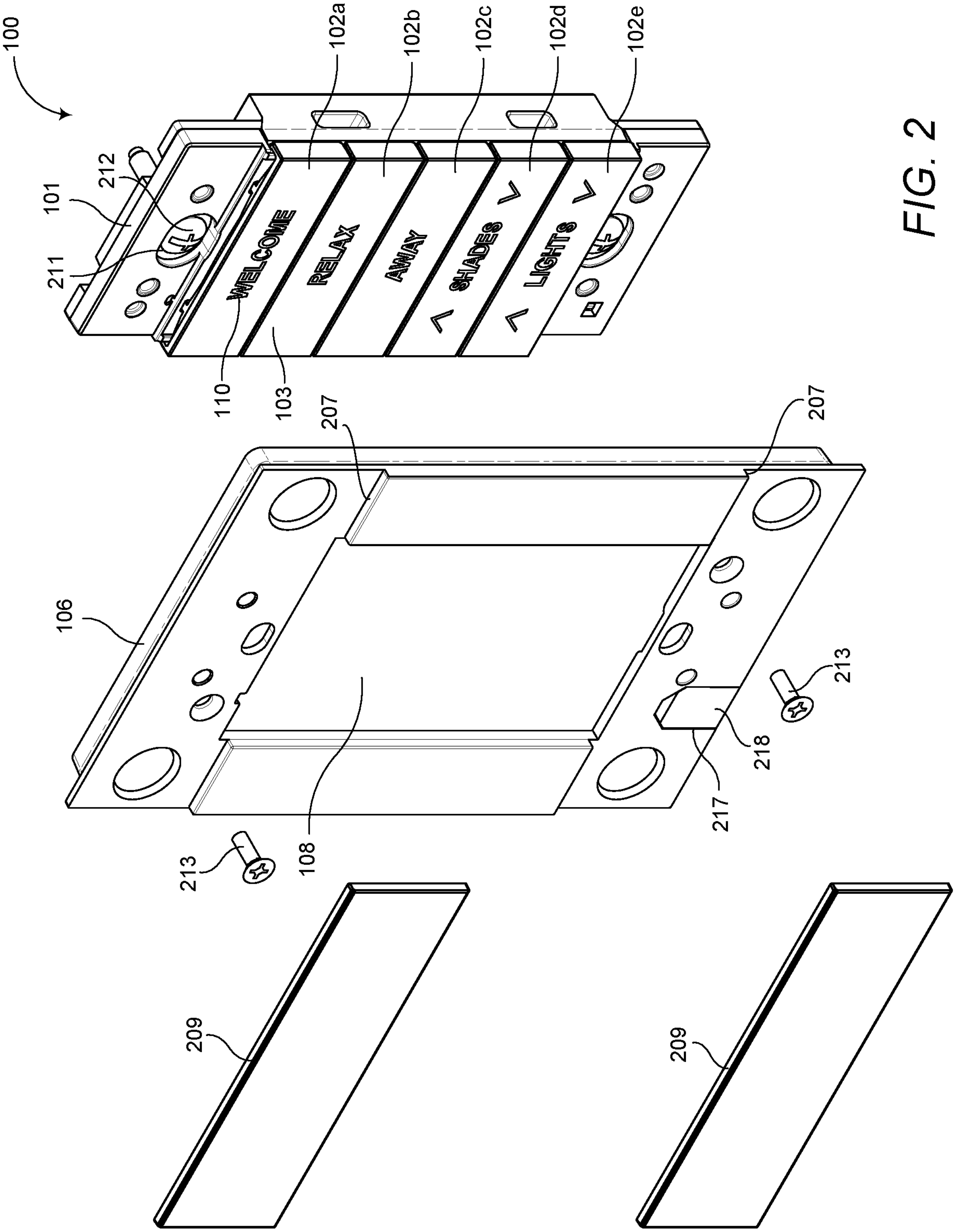

FIG. 2 illustrates a perspective front view of the control device with the faceplate removed according to an illustrative embodiment.

Figure 3:
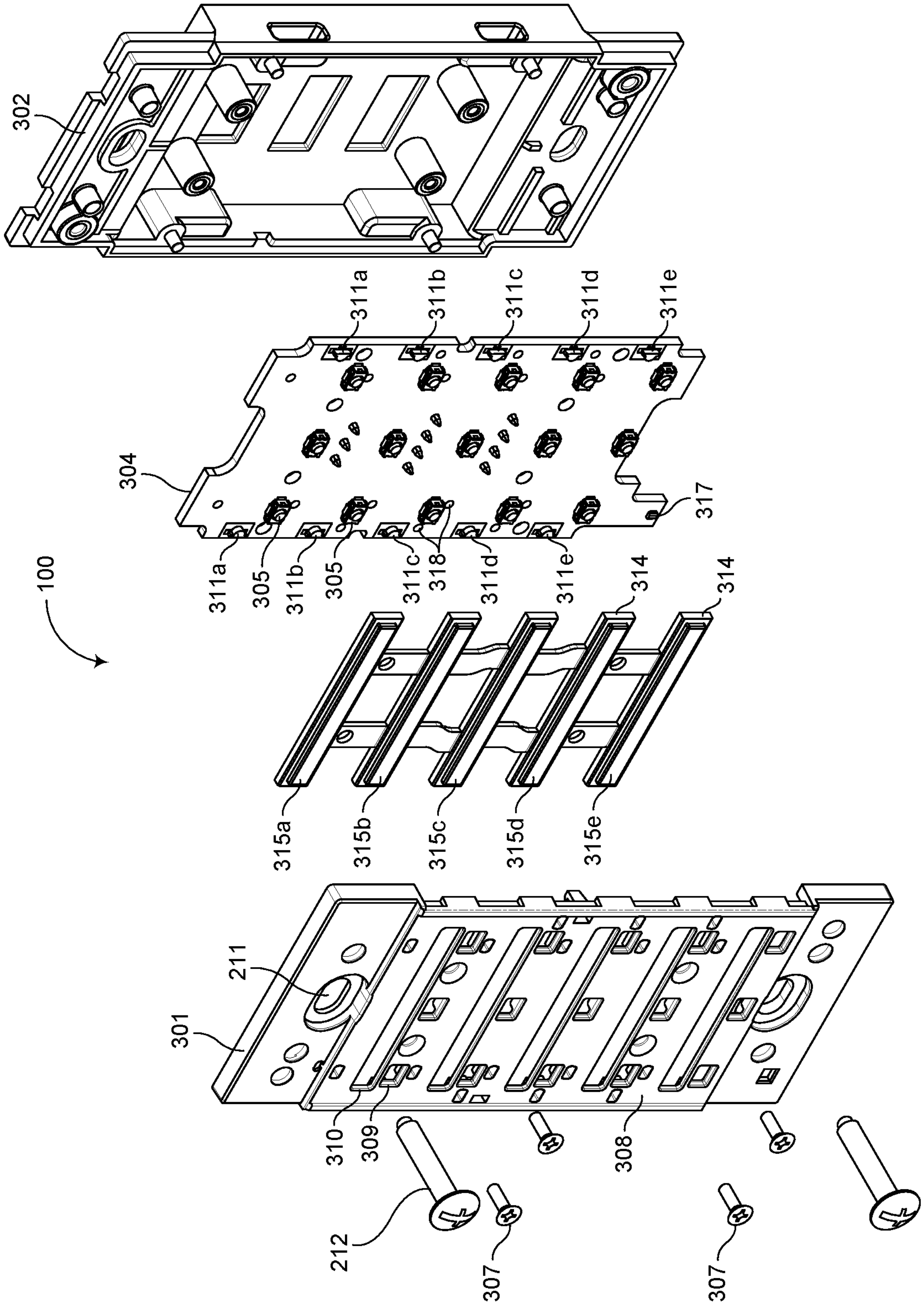

FIG. 3 illustrates an exploded perspective front view of the control device according to an illustrative embodiment.

Figure 4:
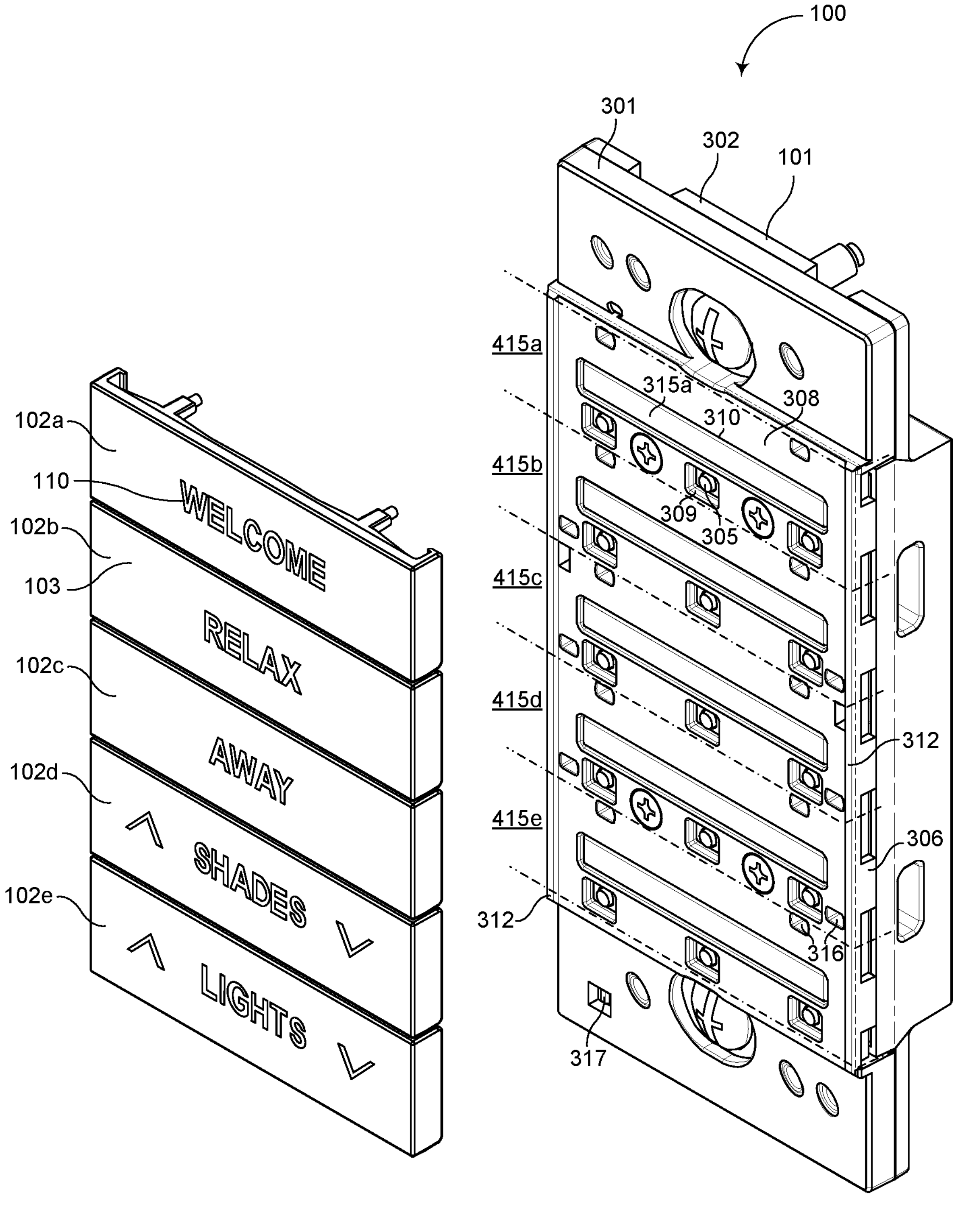

FIG. 4 illustrates a perspective view of the control device with the buttons removed according to an illustrative embodiment.

Figure 5:
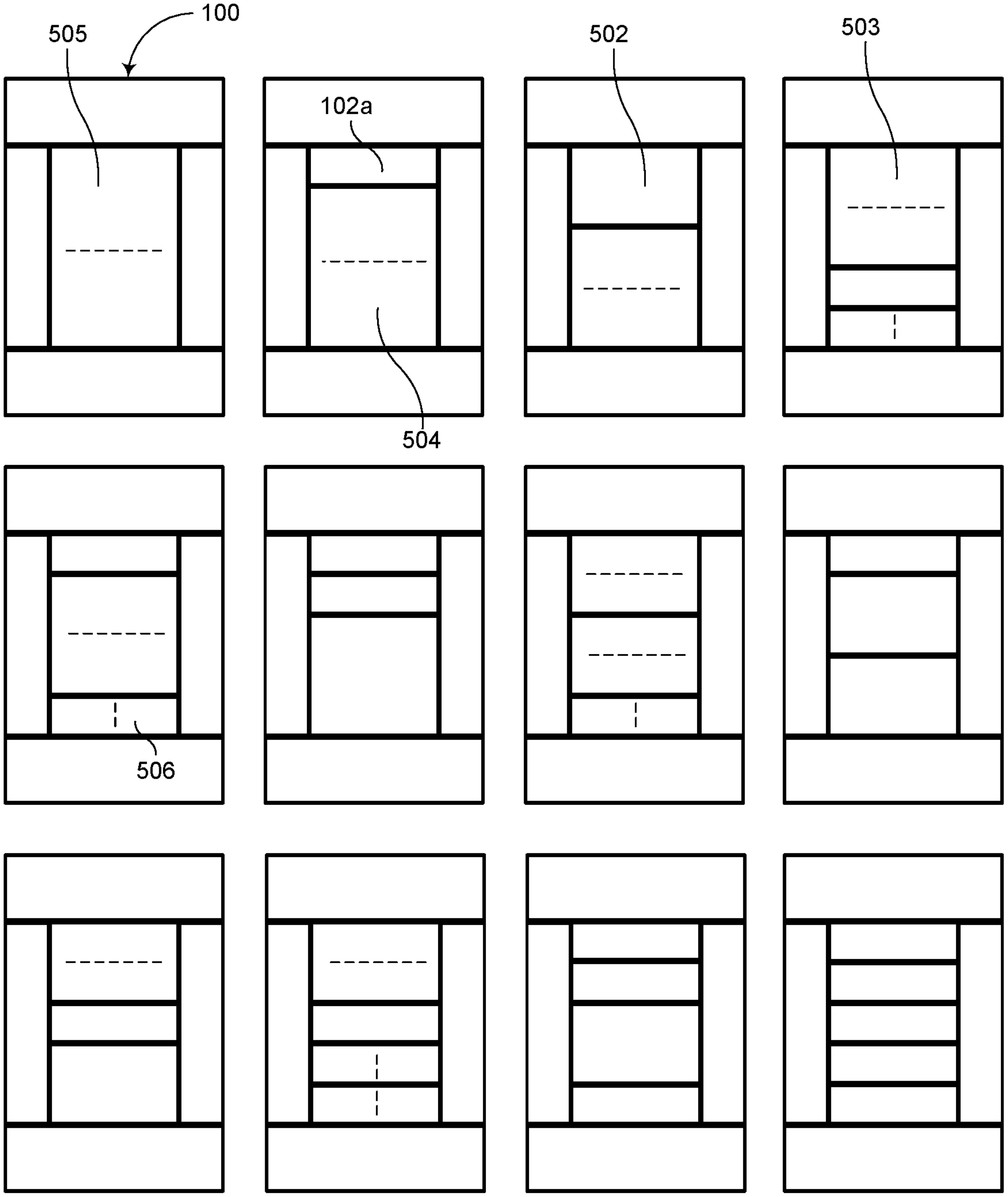

FIG. 5 illustrates various possible button configurations of the control device according to an illustrative embodiment.

Figure 6:
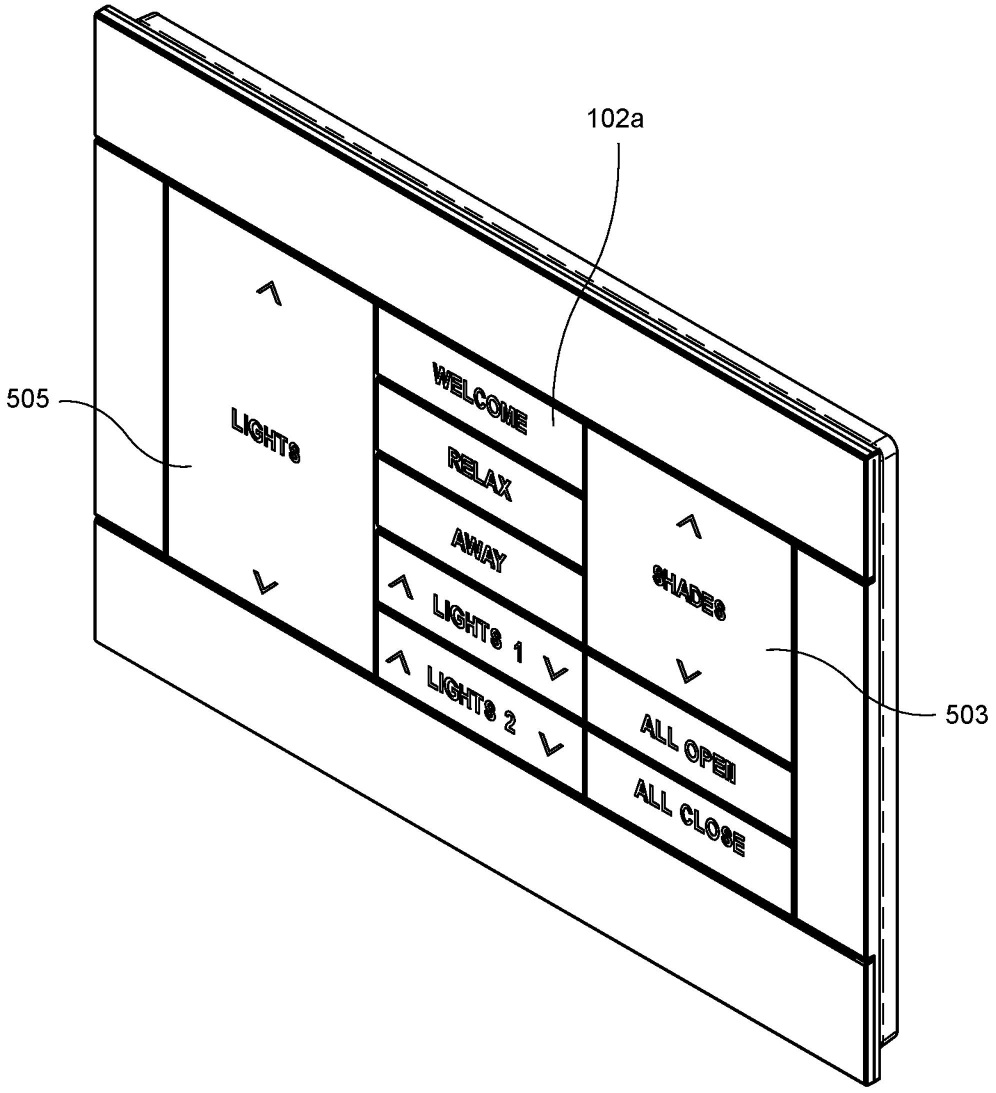

FIG. 6 illustrates a front perspective view of three ganged control devices according to an illustrative embodiment.

Figure 7:
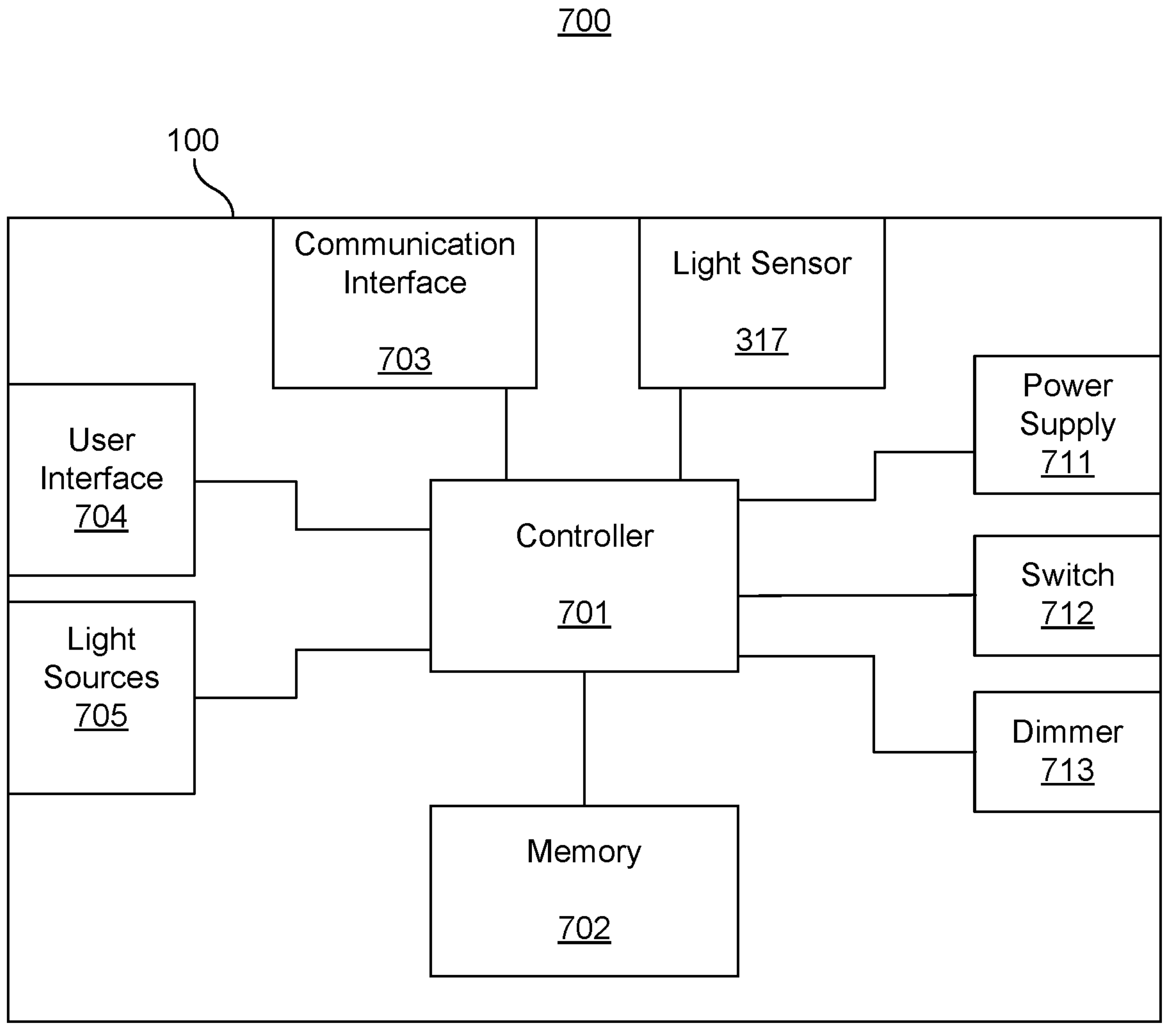

FIG. 7 is an illustrative block diagram of a control device according to an illustrative embodiment.

Figure 8:
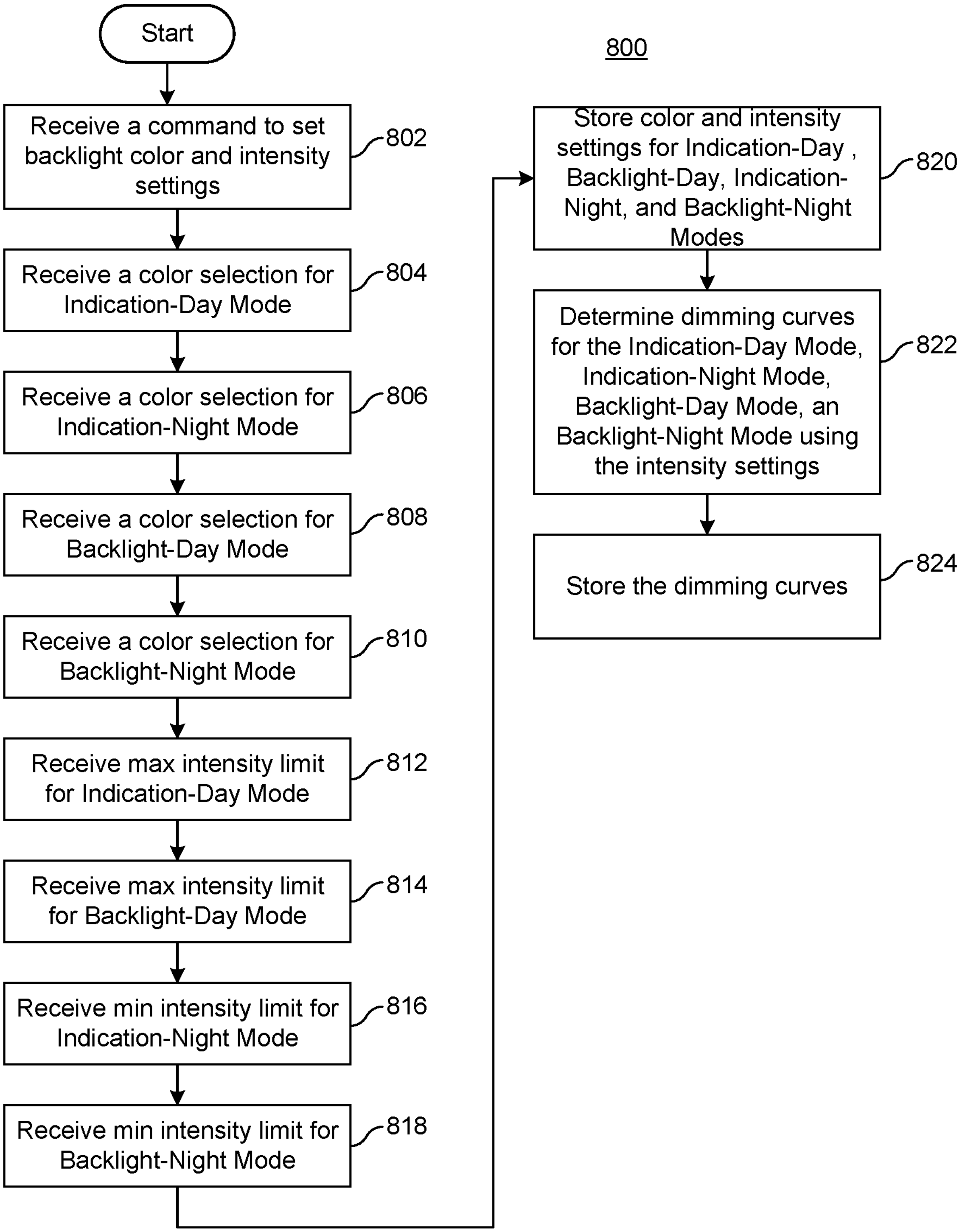

FIG. 8 shows a flowchart illustrating the steps for setting the color and intensity levels for backlight LEDs of the control device according to an illustrative embodiment.

Figure 9:
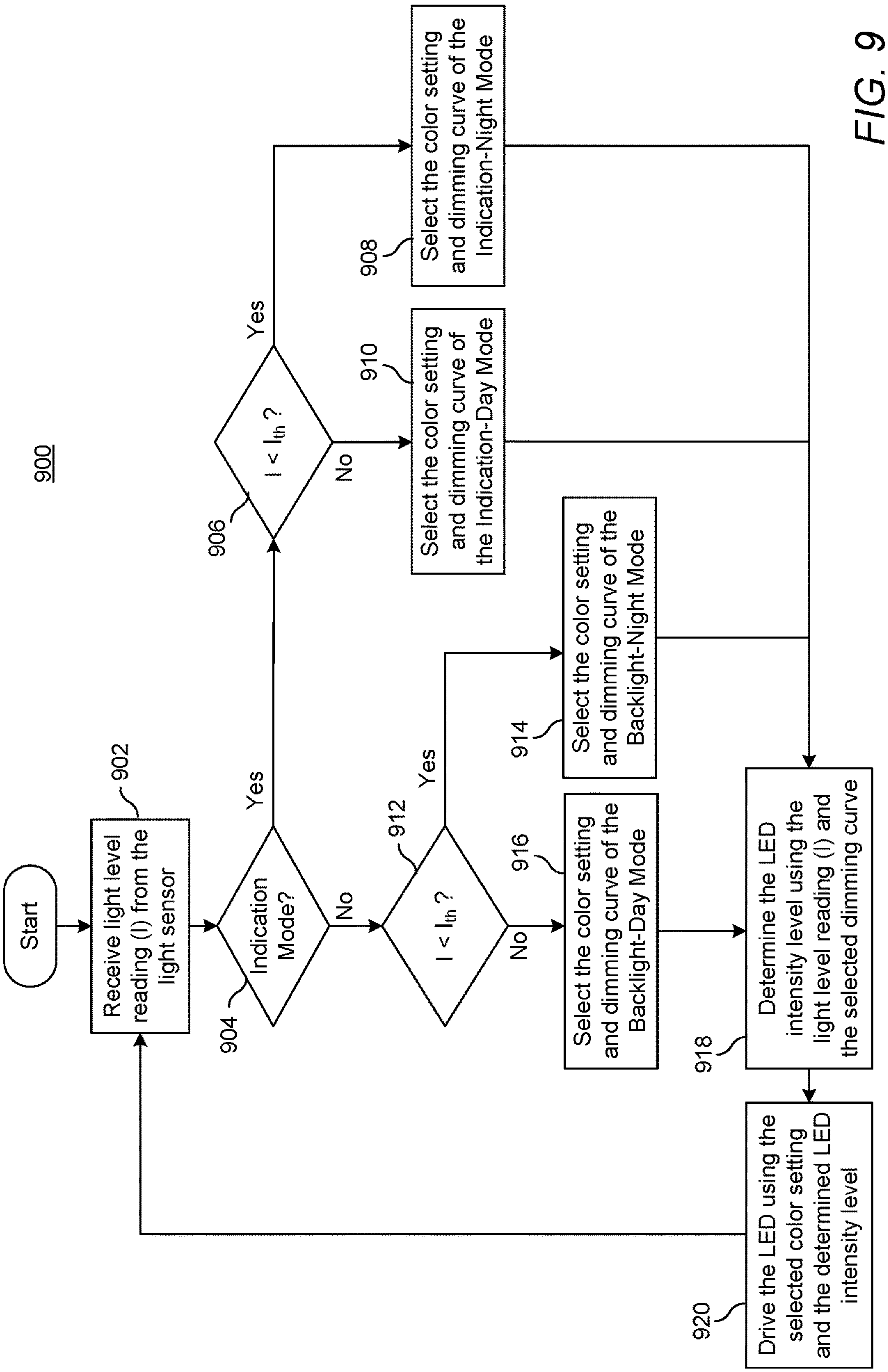

FIG. 9 shows a flowchart illustrating the steps of the operation of the control device based on the set color and intensity levels of backlight LEDs of the control device according to an illustrative embodiment.

Figure 10:
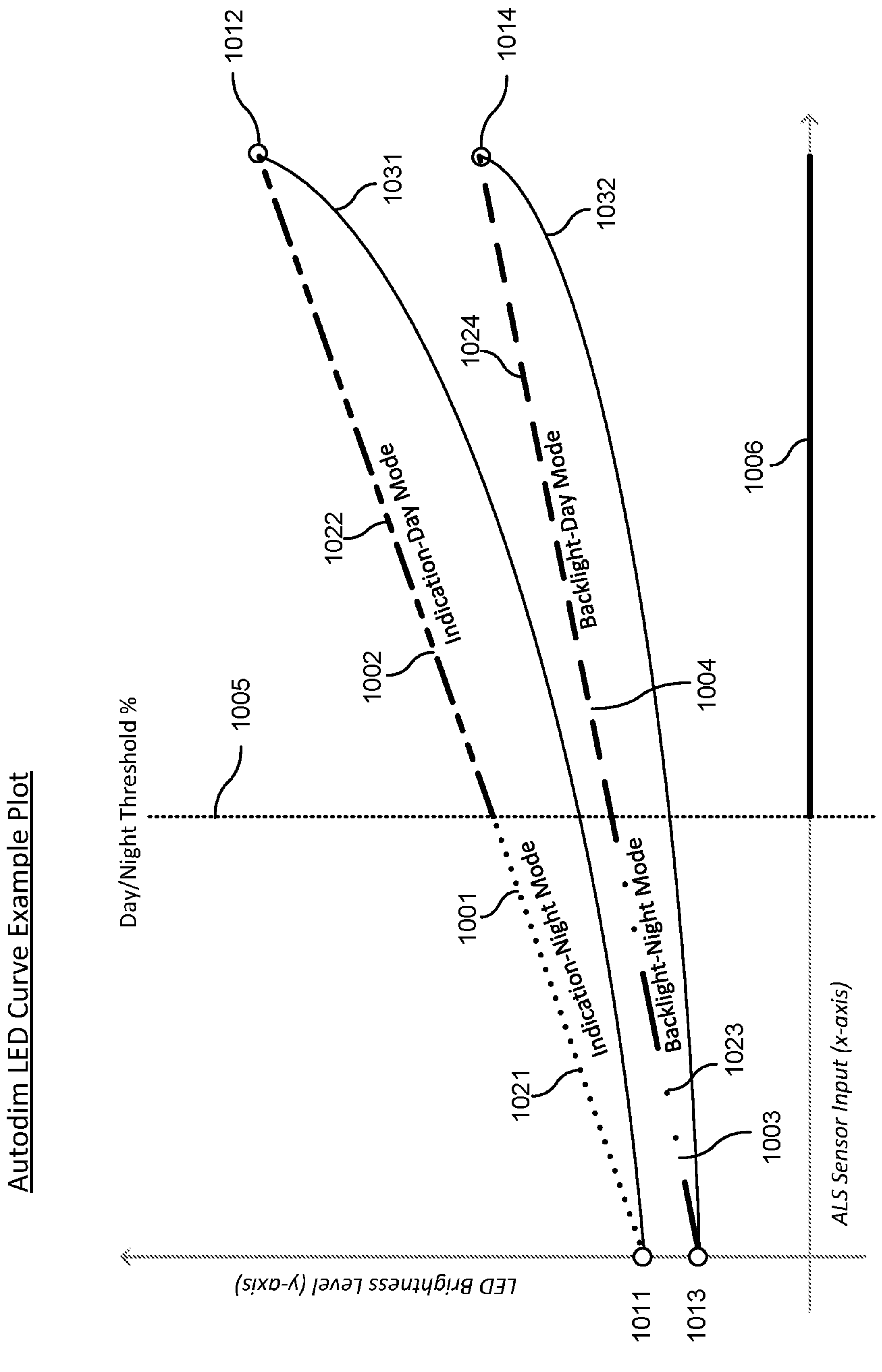

FIG. 10 shows an exemplary graph with illustrative dimming curves for indication mode and backlight mode operations according to an illustrative embodiment.

Figure 11:
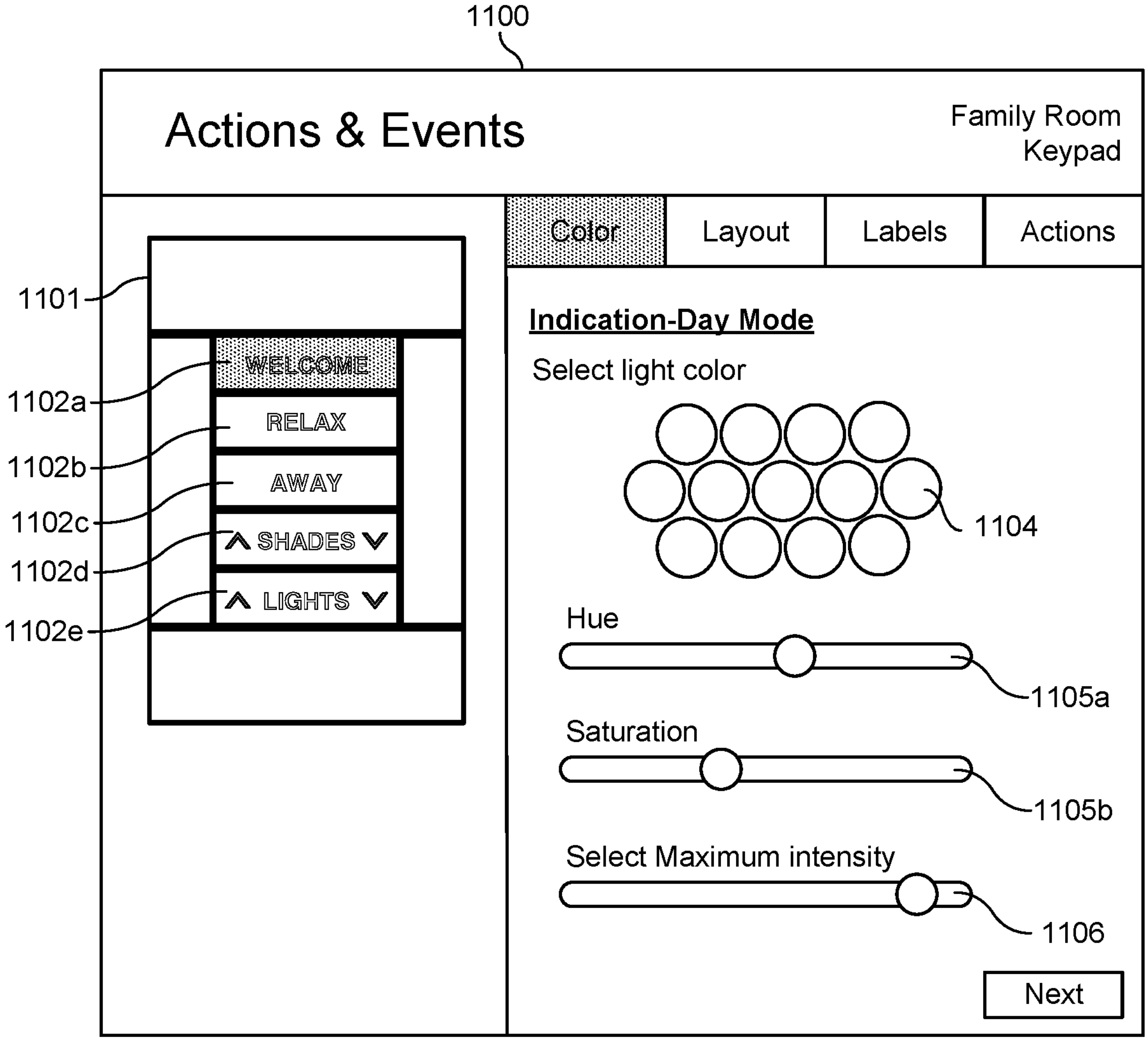

FIG. 11 illustrates an exemplary user interface for selecting color and intensity levels of backlight LEDs according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to “one embodiment” or “an embodiment” means that a particular feature, structure, or characteristic described in connection with an embodiment is included in at least one embodiment of the embodiments. Thus, the appearance of the phrases “in one embodiment” or “in an embodiment” in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

| | |
|---|---|
| 100 | Control Device |
| 101 | Housing |
| 102a-e | Buttons |
| 103 | Front Surface |
| 106 | Faceplate |
| 108 | Opening |
| 110 | Indicia |
| 207 | Shoulders |
| 209 | Trim Plate |
| 211 | Mounting Holes |
| 212 | Screws |
| 213 | Screws |
| 217 | Opening |
| 218 | Lens |

-continued

| | |
|---|---|
| 301 | Front Housing Portion |
| 302 | Rear Housing Portion |
| 304 | Printed Circuit Board (PCB) |
| 305 | Tactile Switches |
| 306 | Side Walls |
| 307 | Screws |
| 308 | Front Wall |
| 309 | Openings |
| 310 | Openings |
| 311a-e | Light Sources/Light Emitting Diodes (LEDs) |
| 314 | Side Edges |
| 315a-e | Light Bars |
| 316 | Orifices |
| 317 | Light Sensor |
| 415a-e | Button Zones |
| 502 | Two Height Button |
| 503 | Three Height Button |
| 504 | Four Height Button |
| 505 | Five Height Button |
| 506 | One Height Rocker Button |
| 700 | Block Diagram of a Control Device |
| 701 | Controller |
| 702 | Memory |
| 703 | Communication Interface |
| 704 | User Interface |
| 705 | Light Sources |
| 711 | Power Supply |
| 712 | Switch |
| 713 | Dimmer |
| 800 | Flowchart Illustrating the Steps for Setting the Color and Intensity Levels for Backlight LEDs of the Control Device |
| 802-824 | Steps of Flowchart 800 |
| 900 | Flowchart Illustrating the Steps of the Operation of the Control Device Based on the Set Color and Intensity Levels of the Backlight LEDs of the Control Device |
| 902-920 | Steps of Flowchart 900 |
| 1001 | Indication-Night Dimming Curve |
| 1002 | Indication-Day Dimming Curve |
| 1003 | Backlight-Night Dimming Curve |
| 1004 | Backlight-Day Dimming Curve |
| 1005 | Day/Night Threshold |
| 1006 | Indication-Day Dimming Curve with Zero Slope and Zero Offset |
| 1011 | Minimum Indication-Night Mode Intensity Limit |
| 1012 | Maximum Indication-Day Mode Intensity Limit |
| 1013 | Minimum Backlight-Night Mode Intensity Limit |
| 1014 | Maximum Backlight-Day Mode Intensity Limit |
| 1021 | Indication-Night Mode Color Selection |
| 1022 | Indication-Day Mode Color Selection |
| 1023 | Backlight-Night Mode Color Selection |
| 1024 | Backlight-Day Mode Color Selection |
| 1031 | Indication Mode Logarithmic Curve |
| 1032 | Backlight Mode Logarithmic Curve |
| 1100 | User Interface |
| 1101 | Representation of the Control Device |
| 1102a-e | Selectable Buttons |
| 1104 | Selectable Color Fields |
| 1105a | Hue Selection Slider |
| 1105b | Saturation Selection Slider |
| 1106 | Maximum Intensity for Indication Mode Selection Slider |

LIST OF ACRONYMS USED IN THE SPECIFICATION IN ALPHABETICAL ORDER

The following is a list of the acronyms used in the specification in alphabetical order.

| | |
|---|---|
| AC | Alternating Current |
| ASIC | Application Specific Integrated Circuit |
| AV | Audiovisual |
| DC | Direct Current |
| HSL | Hue, Saturation, Lightness |
| HSV | Hue, Saturation, Value |
| HVAC | Heating, Ventilation and Air Conditioning |
| I | Intensity |

-continued

| | |
|---|---|
| IR | Infrared |
| $I_{th}$ | Day/Night Threshold |
| LED | Light Emitting Diode |
| lux | Luminous Flux |
| MCD | Millicandela |
| PCB | Printed Circuit Board |
| PoE | Power-over-Ethernet |
| PWM | Pulse Width Modulation |
| RAM | Random-Access Memory |
| RF | Radio Frequency |
| RGB | Red-Green-Blue |
| RISC | Reduced Instruction Set Computer |
| ROM | Read-Only Memory |
| sRGB | Standard RGB |
| SSR | Solid-State Relay |
| TRIAC | Thyristor |
| XYZ | International Commission on Illumination (CIE) XYX Color Space |

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of wall mounted control devices, but are not limited thereto, except as may be set forth expressly in the appended claims. Particularly, the aspects of the embodiments are related to an apparatus, system, and method for an automatic dimming and color adjusting backlight for wall mounted control device buttons.

Referring to FIG. 1, there is shows a perspective front view of an illustrative wall mounted control device 100 according to an illustrative embodiment. The control device 100 may serve as a user interface to associated loads or load controllers in a space. According to an embodiment, the control device 100 may be configured as a keypad comprising a plurality of buttons, such as five single height buttons 102*a-e*. Each button 102*a-e* may be associated with a particular load and/or to a particular operation of a load. For example, different buttons 102*a-e* may correspond to different lighting scenes of lighting loads. However, other button configuration may be used. According to various embodiments, the control device 100 may be configured as a lighting switch or a dimmer having a single button that may be used to control an on/off status of the load. Alternatively, or in addition, the single button can be used to control a dimming setting of the load.

In an illustrative embodiment, the control device 100 may be configured to receive control commands from a user via buttons 102*a-e* and either directly or through a control processor transmit the control command to a load (such as a light, fan, window blinds, etc.) or to a load controller (not shown) electrically connected to the load to control an operation of the load based on the control commands. In various aspects of the embodiments, the control device 100 may control various types of electronic devices or loads. The control device 100 may comprise one or more control ports for interfacing with various types of electronic devices or loads, including, but not limited to audiovisual (AV) equipment, lighting, shades, screens, computers, laptops, heating, ventilation and air conditioning (HVAC), security, appliances, and other room devices. The control device 100 may be used in residential load control, or in commercial settings, such as classrooms or meeting rooms.

Each button 102*a-e* may comprise indicia 110 disposed thereon to provide clear designation of each button's function. Each button 102*a-e* may be backlit, for example via light emitting diodes (LEDs), for visibility and/or to provide status indication of the button 102*a-e*. For example, buttons 102*a-e* may be backlit by white, blue, or another color LEDs. In addition, different buttons 102*a-e* may be backlit via different colors, for example, to distinguish between buttons, load types (e.g., emergency load), or the load state (e.g., on, off, or selected scene), AV state (e.g., selected station or selected channel), or button backlight colors may be chosen to complement the surroundings or to give a pleasing visual effect. Buttons 102*a-e* may comprise opaque material while the indicia 110 may be transparent or translucent allowing light from the LEDs to pass through the indicia 110 and be perceived from the front surface 103 of the button 102*a-e*. The indicia 110 may be formed by engraving, tinting, printing, applying a film, etching, and/or similar processes.

Reference is now made to FIGS. 1 and 2, where FIG. 2 shows the control device 100 with the faceplate 106 removed. The control device 100 may comprise a housing 101 adapted to house various electrical components of the control device 100, such as the power supply and an electrical printed circuit board (PCB) 304 (FIG. 3). The housing 101 is further adapted to carry the buttons 102*a-e* thereon. The housing 101 may comprise mounting holes 211 for mounting the control device 100 to a standard electrical box via screws 212. According to another embodiment, control device 100 may be mounted to other surfaces using a dedicated enclosure. According yet to another embodiment, the control device 100 may be configured to sit freestanding on a surface, such as a table, via a table top enclosure. Once mounted to a wall or an enclosure, the housing 101 may be covered using a faceplate 106. The faceplate 106 may comprise an opening 108 sized and shaped for receiving the buttons 102*a-e* therein. The faceplate 106 may be secured to the housing 101 using screws 213. The screws 213 may be concealed using a pair of decorative trim plates 209, which may be removably attached to the faceplate 106 using magnets (not shown). However, other types of faceplates may be used.

Referring now to FIG. 3, which illustrates an exploded view of the control device 100. Housing 101 of control device 100 may comprise a front housing portion 301 and a rear housing portion 302. The rear housing portion 302 may fit within a standard electrical or junction box and may be adapted to contain various electrical components, for example on a printed circuit board (PCB) 304, configured for providing various functionality to the control device 100, including for receiving commands and transmitting commands wirelessly to a load or a load controlling device. FIG. 7 is an illustrative block diagram of the electrical components of the control device 100. Control device 100 may comprise a power supply 711 that may be housed in the rear housing portion 302 for providing power to the various circuit components of the control device 100. The control device 100 may be powered by an electric alternating current (AC) power signal from an AC mains power source or via DC voltage. Such control device 100 may comprise leads or terminals suitable for making line voltage connections. In yet another embodiment, the control device 100 may be powered using Power-over-Ethernet (PoE) or via a Cresnet® port. Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable. However, other types of connections or ports may be utilized.

The printed circuit board 304 of the control device 100 may include a controller 701 comprising one or more microprocessors, such as "general purpose" microprocessors, a combination of general and special purpose microprocessors, or application specific integrated circuits (ASICs). Additionally, or alternatively, the controller 701 can include one or more reduced instruction set (RISC) processors, video processors, or related chip sets. The controller 701 can provide processing capability to execute an operating system, run various applications, and/or provide processing for one or more of the techniques and functions described herein.

The PCB 304 of the control device 100 can further include a memory 702. Memory 702 can be communicably coupled to the controller 701 and can store data and executable code. The memory 702 can represent volatile memory such as random-access memory (RAM), but can also include non-volatile memory, such as read-only memory (ROM) or Flash memory. In buffering or caching data related to operations of the controller 701, memory 702 can store data associated with applications running on the controller 701.

The PCB 304 can further comprise one or more communication interfaces 703, such as a wired or a wireless communication interface, configured for transmitting control commands to various connected loads or electrical devices, and receiving feedback. A wireless interface may be configured for bidirectional wireless communication with other electronic devices over a wireless network. In various embodiments, the wireless interface can comprise a radio frequency (RF) transceiver, an infrared (IR) transceiver, or other communication technologies known to those skilled in the art. In one embodiment, the wireless interface communicates using the infiNET EX® protocol from Crestron Electronics, Inc. of Rockleigh, NJ. infiNET EX® is an extremely reliable and affordable protocol that employs steadfast two-way RF communications throughout a residential or commercial structure without the need for physical control wiring. In another embodiment, communication is employed using the ZigBee® protocol from ZigBee Alliance. In yet another embodiment, the wireless communication interface may communicate via Bluetooth transmission. A wired communication interface may be configured for bidirectional communication with other devices over a wired network. The wired interface can represent, for example, an Ethernet or a Cresnet® port. In various aspects of the embodiments, control device 100 can both receive the electric power signal and output control commands through the PoE interface.

The control device 100 may further comprise a user interface 704.

Particularly, the front surface of the PCB 304 may comprise a plurality of micro-switches or tactile switches 305. For example, the PCB 304 may contain fifteen tactile switches 305 arranged in three columns and five rows to accommodate various number of button configurations. However, other number of switches and layouts may be utilized to accommodate other button configurations. The tactile switches 305 are adapted to be activated via buttons 102*a-e* to receive user input.

The control device 100 may also comprise a switch 712 configured for switching a connected load on or off, such as a lighting load, an HVAC, or the like. According to one embodiment, switch 712 may comprise an electromechanical relay, which may use an electromagnet to mechanically operate a switch. In another embodiment, switch 712 may comprise a solid-state relay (SSR) comprising semiconductor devices, such as thyristors (e.g., TRIAC) and transistors.

In addition, the control device 100 may comprise a dimmer 713 configured for providing a dimmed voltage output to a connected load, such as a lighting load. The dimmer 713 may comprise a solid-state dimmer for dimming different types of lighting loads, including incandescent, fluorescent, LED, or the like. According to an embodiment, the dimmer 713 may comprise a 0-10V DC dimmer to provide a dimmed voltage output to an LED lighting load, a fluorescent lighting load, or the like. The dimmer 713 of the control device 100 may reduce its output based on light levels reported by the light sensor 317.

The PCB 304 of the control device 100 may further comprise a plurality of light sources 705 configured for providing backlighting to corresponding buttons 102*a-e*. Each light source 705 may comprise a multicolored light emitting diode (LED) 311*a-e*, such as a red-green-blue LED (RGB LED), comprising of red, green, and blue LED emitters in a single package. Each red, green, and blue LED emitter can be independently controlled at a different intensity. Although a white LED emitter or LED emitters of other colors can be instead or additionally included. The plurality of LEDs 311*a-e* may be powered using LED drivers located on PCB 304. According to an embodiment, each red, green, and blue LED emitter can be controlled using pulse width modulation (PWM) signal with a constant current LED driver with output values ranging between 0 and 65535 for a 16-bit channel—with 0 meaning fully off and 65535 meaning fully on. Varying these PWM values of each of the red, green, and blue LED emitters on each LED 311*a-e* allows the LED 311*a-e* to create any desired color within the device's color gamut. According to an embodiment, a pair of LEDs 311*a-e* may be located on two opposite sides of each row of tactile switches 305.

The PCB 304 may further comprise a light sensor 317 configured for detecting and measuring ambient light. According to an embodiment, light sensor 317 can comprise at least one closed-loop photosensor having an internal photocell with 0-65535 lux (0-6089 foot-candles) light sensing output to measure light intensity from natural daylight and ambient light sources. Light sensor 317 may be used to control the intensity of the load that is being controlled by the control device 100. In addition, light sensor 317 may be used to control the intensity levels of LEDs 311*a-e* based on the measured ambient light levels, as further described below. According to an embodiment, light sensor 317 may impact the intensity levels of LEDs 311*a-e* to stay at the same perceived brightness with respect to the measured ambient light levels. A dimming curve may be used to adjust the brightness of LEDs 311*a-e* based on measured ambient light levels by the light sensor 317. According to another embodiment, ambient light sensor threshold values may be used to adjust the LED intensity. According to yet another embodiment, light sensor 317 may impact the color of the LEDs 311*a-e* based on the measured ambient light levels, as further discussed below. Referring to FIG. 2, the faceplate 106 may comprise an opening 217 adapted to contain a lens 218. Lens 218 may direct ambient light from a bottom edge of the faceplate 106 toward the light sensor 317. The lens

218 may be hidden from view by the trim plate 209. The PCB 304 may comprise other types of sensors, such as motion or proximity sensors.

Referring back to FIG. 3, the control device 100 may further comprise a plurality of horizontally disposed rectangular light pipes or light bars 315*a-e* each adapted to be positioned adjacent a respective row of tactile switches 305 and between a respective pair of LEDs 311*a-e*. For example, each light bar 315*a-e* may be positioned above a respective row of tactile switches 305, as shown in FIG. 4. According to one embodiment, the light bars 315*a-e* may be individually attached to the front surface of the PCB 304, for example, using an adhesive. According to another embodiment, the light bars 315*a-e* may be interconnected into a single tree structure as shown in FIG. 3 and adapted to be attached within the housing 101 via screws 307. Each light bar 315*a-e* is configured for distributing and diffusing light from the respective pair of LEDs 311*a-e* to an individual button 102*a-e* for uniform illumination as well as reduced shadowing and glare. Light bars 315*a-e* may be fabricated from optical fiber or transparent plastic material such as acrylic, polycarbonate, or the like. Each pair of oppositely disposed LEDs 311*a-e* may extend out of the front surface of the PCB 304 and may be configured to direct light to opposite side edges 314 of a respective light bar 315*a-e*. As such, when a pair of LEDs 311*a-e* are turned on, light is distributed by the light bar 315*a-e* from its side edges 314 and out of its front surface to be directed through the indicia 110 of the respective button 102*a-e*.

The front housing portion 301 is adapted to be secured to the rear housing portion 302 using screws 307 such that the PCB 304 and light bars 315*a-e* are disposed therebetween. The front housing portion 301 comprises a front wall 308 with a substantially flat front surface. The front wall 308 may comprise a plurality of openings 309 extending traversely therethrough that are aligned with and adapted to provide access to the tactile switches 305 as shown in FIG. 4. Front wall 308 may further comprise rectangular horizontal openings 310 extending traversely therethrough aligned with and sized to surround at least a front portion of a respective light bar 315*a-e*. The front housing portion 301 may comprise an opaque material, such as a black colored plastic or the like, that impedes light transmission through the front wall 308 to prevent light bleeding from one set of light bar 315*a-e* and corresponding light sources 311*a-e* to another set.

Referring to FIG. 4, there is shown a perspective view of the control device 100 with the buttons 102*a-e* removed. The control device 100 may define a plurality of button zones 415*a-e* adapted to receive a plurality of rows of different height buttons. Particularly, each button zone 415*a-e* may be configured to receive a single height button 102*a-e*. For example, the control device 100 is shown containing five button zones 415*a-e* adapted to receive five single height buttons, but it may comprise any other number of button zones. According to an embodiment, each button zone 415*a-e* comprises a row of one or more tactile switches 305, one or more button alignment orifices 316, a light bar 315*a-e*, and a pair of corresponding LEDs 311*a-e*. According to an embodiment shown in FIG. 4, each button zone 415*a-e* may comprise a row of three tactile switches 305. The two side switches 305 of each button zone 415*a-e* may be used for a left/right rocker function, while the center switch 305 of each button zone 415*a-e* may be used for a single press button or be part of an up/down rocker function. In addition, backlighting of each button zone 415*a-e* may be independently controllable. Because the button zones 415*a-e* are isolated and masked using the front housing portion 301, backlighting of one zone does not bleed into the adjacent zones. Additionally, each light bar 315*a-e* is adapted to be disposed in substantially the center of the respective button zone 415*a-e* and comprises a width that spans substantially the width of the front wall 308 of the front housing portion 301 such that the indicia 110 on the corresponded button 102*a-e* is backlighted evenly.

Referring to FIG. 5, two or more button zones 415*a-e* may be combined to receive a multi-zone height button, such as a two-zone height button 502, a three-zone height button 503, a four-zone height button 504, or a five-zone height button 505. According to another embodiment, a one zone height button may comprise a rocker button 506. As such, the control device 100 of the present embodiments may interchangeably receive various multi-zone height buttons to provide a vast number of possible configurations, as required by an application, some of which are shown in FIG. 5. Other button assembly configurations are also contemplated by the present embodiments. Additionally, depending on which tactile switches 305 are exposed by a button, the various single or multi-zone button heights may be configured to operate as a single press button, a left/right rocker, or an up/down rocker, as discussed below. According to an embodiment, the various button configurations beneficially share the same circuit board layout shown in FIG. 3 by utilizing one or more of the tactile switches 305. In addition, for buttons that span two or more button zones 415*a-e*, one or more lines of indicia 110 may be included and individually backlit, for example as shown in FIG. 6. Each line of indicia 110 may be aligned with backlighting of any one of the button zone 415*a-e*. For example, referring to FIG. 6, a three-zone height button 503 may comprise three lines of indicia, each individually backlit by a respective zone. A five-zone height button 505 may also comprise three lines of individually backlit indicia, while backlighting of zones containing no indicia may be unused.

The wall-mounted control device 100 can be configured in the field, such as by an installation technician, in order to accommodate many site-specific requirements. Field configuration can include selection and installation of an appropriate button configuration based on the type of load, the available settings for the load, etc. Advantageously, such field configurability allows an installation technician to adapt the electrical device to changing field requirements (or design specifications). Beneficially, the buttons are field replaceable without removing the device from the wall. After securing the buttons 102*a-e* on the control device 100, the installer may program the button configuration through tapping all of the placed buttons. The configured buttons can then be assigned to a particular load or function.

Referring back to FIGS. 1 and 3, and as discussed above, each button 102*a-e* comprises indicia 110 that identifies each button's function. This indicia 110 may be backlit using RGB LEDs 311*a-e* to illuminate the engraved labels. According to the present embodiments, the color of these LEDs 311*a-e* may be adjusted to any color for custom color backlighting. According to the present embodiments, the built-in ambient light sensor 317 may enable automatic dimming of the backlight brightness or intensity of the LEDs 311*a-e* across the full range of ambient light in the room. This will allow the engraved buttons 102*a-e* to be at optimal brightness any time of day, maximizing readability and minimizing obtrusiveness under various room condition. In addition, as discussed below, the intensity of the LEDs 311*a-e* may be adjusted to a different brightness based on the operation of the control device 100. For example, the control device 100 may operate according to an indication mode and a backlight mode. The control device 100 may generally operate the LEDs 311*a-e* or one or more of the buttons 102*a-e* pursuant to a backlight mode to be lit at a low brightness—allowing the control device 100 to be backlit without being obtrusive. For example, the control device 100 may operate one or more of the LEDs 311*a-e* pursuant to the backlight mode when a button 102*a-e* of the control device 100 is in an idle state for a predetermined period of time. The control device 100 may switch the LEDs 311*a-e* of one or more buttons 102*a-e* to an indication mode during which they are lit at a higher brightness than idle buttons. Indication mode can be triggered via one or more events, such as but not limited to, upon a press of a button 102*a-e*, when a load turns on, when a load or the control device 100 or the relevant button 102*a-e* changes a state, based on time of day, or upon a receipt of an alarm, a receipt of a local signal for example from the firmware, or a receipt of a remote signal, such as from a sensor (e.g., a light sensor, a motion sensor, or the like), a building control system, a gateway, a load, a remote control, or the like.

According to a further embodiment, as discussed below in greater detail, the control device 100 may set different LED backlight colors for indication mode, backlight mode, based on detected light level conditions in the room where the control device 100 is installed, and/or in response to other conditions. For example, at night the LED color may be set to red and during the day the LED color may be set to blue. Alternatively, the LED may be set to different color temperatures during the day mode and the night mode—for example, night mode backlighting may be set to a warmer color temperature and day mode backlighting may be set to a cool color temperature. Different colors may be also used for indication and backlight modes in combination with day and night modes. For example, at night during indication mode the LED backlight color may be set to red, at night during backlight mode the LED backlight color may switch to orange, then at daytime during indication mode the LED backlight color may be set to green, and at daytime during backlight mode the LED backlight color may be set to blue or it may be turned off in its entirety. Of course other colors may be chosen for indication mode, backlight mode, day mode, and/or night mode. In addition, different colors may be chosen for different state options. For example, one color may be chosen for an audio source and a separate color may be chosen for a video source or a lighting source. The control device 100 may further dim these LED backlight colors based on ambient light level conditions as determined by the light sensor 317.

Referring to FIG. 8, there is shown a flowchart 800 illustrating the steps for setting the color and intensity levels for backlight LEDs of the control device 100, and FIG. 10, there is shown a plot representation of the selected color and intensity settings. Steps 802 through 824 may be used to set LED backlighting colors and intensities for all buttons 102*a-e* on control device 100 such that all the buttons 102*a-e* follow the same color and intensity patterns. According to another embodiment, steps 802 through 824 may be repeated to set color and intensity levels for each individual button 102*a-e* on control device 100 such that buttons 102*a-e* may be backlit individually in different selected colors. For clarity and illustrative purposes, the below descriptions with reference to FIGS. 8 through 11 are made with regard to setting backlighting for the upper most button 102*a* associated with LEDs 311*a* in button zone 415*a*. However, it should be understood that the same methods can be utilized to set backlighting for the other buttons 102*b-e* of the control device 100 associated with LEDs 311*b-e* in button zones 415*b-e*, respectively.

Initially, in step 802 the controller 701 of the control device 100 receives a command to set backlight color and intensity settings for LEDs 311*a* in button zone 415*a*. According to one embodiment, the backlight LED color and intensity settings may be selected and preset at the factory to a default setting. According to another embodiment, the backlight LED color and intensity settings may be selected by the user, after installation at the installation site, to a desired color for day mode and desired color for night mode.

In step 804, the control device 100 may receive a color selection 1022 (FIG. 10) for an indication-day mode, for example green. In step 806, the control device 100 may receive a color selection 1021 for indication-night mode, for example red. In step 808, the control device 100 may receive a color selection 1024 for a backlight-day mode, for example blue. Then, in step 810, the control device 100 may receive a color selection 1023 for backlight-night mode, for example orange. It should be understood that although the present embodiments are described with four color settings for different modes, the number of color settings may be scaled up or down to other number of color settings, such as for example two color settings, one for day mode and another for night mode irrespective of whether the control device 100 is at an indication mode or a backlight mode.

In step 812, the control device 100 may receive a selection of a maximum intensity limit 1012 for the indication-day mode, for example at 100%, and in step 814 the control device 100 may receive a selection of a maximum intensity limit 1014 for the backlight-day mode, for example at 60%. Similarly, in step 816 the control device 100 may receive a minimum intensity limit 1011 for the indication-night mode, for example at 4%, and in step 818 the control device 100 may receive a minimum intensity limit 1013 for the backlight-night mode, for example at 2%. As discussed above, during the indication mode it is desired that the maximum brightness of the backlighting is higher than during the backlight mode.

In step 820, the color and intensity settings received by the control device 100 in steps 804-818 are stored in memory 702. The color settings can be stored as color values that represent color in a color space, as is known in the art, such as but not limited to RGB (Red-Green-Blue), HSV (hue, saturation, value), HSL (hue, saturation, lightness), XYZ, and xyY color values, or the like.

According to one embodiment, the above selections may be accomplished using buttons 102*a-e* on the control device 100. According to another embodiment, the selections may be instead made by a user or an installer via a user interface of an automation setup or control application or app running on a computer, a browser, a mobile computing device, or the like. Referring to FIG. 11, there is shown an exemplary user interface 1100 for selecting color and intensity levels of backlight LEDs 311*a-e* for the indication-day mode. According to one embodiment, the user interface 1100 may display a representation of the control device 1101 comprising a plurality of selectable buttons 1102*a-e* each associated with one or more button zones 415*a-e* and their associated LEDs 311*a-e* on the actual control device 100. The user may select the button 1102*a-e* for which the user desires to set or change the backlight color and/or intensity levels. For example, the user may select button 1102*a* to change the backlight color of LEDs 311*a* in button zone 415*a*. The user interface 1100 may present one or more color selection objects that may be used by the user to select a desired color to backlight the selected button 1102*a*. For example, the user interface 1100 may display a hue selection slider 1105*a* and a saturation selection slider 1105*b* for backlight color selection. According to another embodiment, the color selection object may comprise other forms for color selection. For example, the user interface 1100 may comprise a rendering of a color space (such as XYZ color space, an RGB color space, or the like) that the user may touch to select a color. In another embodiment, the user interface may comprise a plurality of color fields or buttons, such as selectable color fields 1104, each preprogrammed with a predefined color from which the user can select the desired color for button backlighting. The user interface 1100 may further comprise an object for a maximum intensity selection for the indication-day mode, such as intensity selection slider 1106, allowing the user to select and dim the intensity for button 1102*a* of the control device 100. After a desired day color and maximum intensities are selected, the selected values may be transmitted from the user interface 1100 to the control device 100. The color and intensity selections for the indication-night mode, backlight-day mode, and backlight-night mode may be accomplished using a user interface similar to the one illustrated in FIG. 11.

In step 822, the control device 100 determines a plurality of diming curves using the intensity settings, including the indication-night mode dimming curve 1001, indication-day mode dimming curve 1002, backlight-night mode dimming curve 1003, and backlight-day mode dimming curve 1004. The control device 100 stores these curves in memory 702 in step 824. Although the present embodiments are described using four dimming curves 1001-1004, other number of dimming curves may be utilized, such as for example one continuous dimming curve for the indication mode and another continuous dimming curve for the backlight mode. According to various embodiments, the dimming curves may be linear curves, logarithmic curves, exponential curves, irregular curves, or the like, or any combinations thereof. According to various embodiments, the dimming curves may be represented using a slope, an equation, a lookup table, or the like, or any combinations thereof. For example, the control device 100 may determine slopes and offsets or y-intercepts to represent each dimming curves 1001-1004 as follows:

Slope_Indication-Day=(Max_Intensity_Indication-Day−Min_Intensity_Indication-Night)/(Max_Sensor_Reading−Min_Sensor_Reading)

Offset_Indication-Day=Min_Intensity_Indication-Night

Slope_Indication-Night=(Max_Intensity_Indication-Day−Min_Intensity_Indication-Night)/(Max_Sensor_Reading−Min_Sensor_Reading)

Offset_Indication-Night=Min_Intensity_Indicatione-Night

Slope_Backlight-Day=(Max_Intensity_Backlight-Day−Min_Intensity_Backlight-Night)/(Max_Sensor_Reading−Min_Sensor_Reading)

Offset_Backlight-Day=Min_Intensity_Backlight-Night

Slope_Backlight-Night=(Max_Intensity_Backlight-Day−Min_Intensity_Backlight-Night)/(Max_Sensor_Reading−Min_Sensor_Reading)

Offset_Backlight-Night=Min_Intensity_Backlight-Night

In this illustrative embodiment, the same dimming curve slope and offset is used for indication-day mode and indication-night mode. Similarly, the same dimming curve slope and offset is used for backlight-day mode and backlight-night mode. Although according to another embodiment, different curves may be used. According to an embodiment, the minimum sensor reading value may be set to zero and the maximum sensor reading value may be set to 65535 for a 16-bit working light level range.

Referring to FIG. 10, there are shown an exemplary graph with illustrative dimming curves that can be determined for the indication mode and backlight mode and day night operation, including an indication-night dimming curve 1001, an indication-day dimming curve 1002, and backlight-night dimming curve 1003, and backlight-day dimming curve 1004. Each dimming curve 1001-1004 illustrates the change in LED intensity or brightness as a function of change in the light level readings by the light sensor 317. For example, if button 102*a* associated with LEDS 315*a* is in an indication mode and the light sensor 317 receives very low light levels, below day/night threshold 1005, the control device 100 will set the LEDs 315*a* to the color 1021 of the indication-night mode and to the intensity that corresponds to the indication-night mode dimming curve 1001. As the light levels detected by the light sensor 317 increase, the intensity of the LEDs 315*a* would gradually increase following the dimming curve 1001 from the selected minimum indication-night intensity 1011 until reaching the intensity corresponding to the day/night threshold 1005. When the detected light level exceeds the day/night threshold 1005, the LEDs 315*a* would transition to the indication-day color 1022 and as the ambient light levels continue to increase, the intensity of the LEDs 315*a* would gradually increase following the indication-day mode dimming curve 1002 from the intensity corresponding to the day-night threshold 1005 until reaching the selected maximum indication-day mode intensity 1012. Similarly, the control device 100 would automatically transition from day color setting 1022 to night color setting 1021 and dim that color transition based on decreasing detected light level conditions. According to an embodiment, the transition between night and day color settings may be either instantaneous or it may cross fade between the day and night color modes using a smooth transition.

When button 102*a* is in a backlight mode, the LEDs 315*a* associated with button 102*a* will be set to backlight mode operation. When the light sensor 317 receives low light levels, below the day/night threshold 1005, the LEDs 315*a* would be set to the night color 1023 and intensity pursuant to the backlight-night mode dimming curve 1003. As the light levels detected by the light sensor 317 increase, the intensity of the LEDs 315*a* would gradually increase following the backlight-night dimming curve 1003 from the selected minimum backlight-night intensity 1013 until reaching the intensity corresponding to the day/night threshold 1005. When the detected light level exceeds the day/night threshold 1005, the LEDs 315*a* would transition to the day color 1024 and as the detected light levels continue to increase, the intensity of the LEDs 315*a* would increase following the backlight-day dimming curve 1004 until reaching the selected maximum backlight-day mode intensity 1014.

While the embodiments discussed above were described using an indication mode and a backlight mode, the control device 100 may operate the LEDs 315*a-e* using a single operating mode (irrespective whether the control device 100 is in an indication state or an idle state) and using a single dimming curve. Alternatively, the control device 100 may operate the LEDs 315*a-e* using more than two operating modes. In addition, instead of selecting four end points 1011-1014 of LED intensity, the control device 100 may interpolate one or more of these points 1011-1014 based on a selection of at least one point. For example, the user may select the desired minimum indication-night intensity 1011 and the desired maximum indication-day intensity 1012, and the control device 100 may interpolate minimum backlight mode intensity 1013 and maximum backlight mode intensity 1014 by reducing the intensity levels in both cases by some predetermined rate.

According to another embodiment, the user may select the LEDs 315*a* to be turned off during the indication-day mode, or during any other mode, thereby setting the slope and the offset of the indication-day mode to zero as represented by line 1006 in FIG. 10. In addition, it is desired that the LED intensity levels for the indication mode are higher than the intensity levels for the backlight mode operation, and that the maximum settings are higher than the minimum settings. For example, if all of the minimum and maximum intensity limits 1011-1014 are set and none of the slopes of the dimming curves 1001-1004 are zero, and the minimum indication-night mode intensity limit 1011 is smaller than the minimum backlight-night mode intensity limit 1013, then the minimum indication-night mode intensity limit 1011 is set to the minimum backlight-night mode intensity limit 1013. Similarly, if the maximum indication-day mode intensity limit 1012 is smaller than the maximum backlight-day mode intensity limit 1014, then the maximum indication-day mode intensity limit 1012 is set to the maximum backlight-day mode intensity limit 1014. To prevent negative slopes, if the minimum indication-night mode intensity limit 1011 is larger than the maximum indication-day mode intensity limit 2012, then the maximum indication-day mode intensity limit 2012 is set to the minimum indication-night mode intensity limit 1011—in other words, the slope of the indication dimming curves 1001-1002 are set to zero and the offset are set to the selected minimum indication-night intensity 1011 (i.e., to maintain the LEDs at constant minimum indication-night intensity 1011). Similarly, if the minimum backlight-night mode intensity limit 1013 is larger than the maximum backlight-day mode intensity limit 1014, then the maximum backlight-day mode intensity limit 1014 is set to the minimum backlight-night mode intensity limit 1013—in other words, the slope of the backlight dimming curves 1003-1004 are set to zero and the offsets are set to the selected minimum backlight-night intensity 1013.

According to an embodiment, the day/night threshold 1005 may comprise a predetermined light level value, for example a value between zero and 65535 for a 16-bit working light level range. According to another embodiment, the day/night threshold 1005 may be automatically selected based on the ambient light sensor feedback range detected. According to another embodiment, the day/night threshold 1005 may be chosen by the user. According to a further embodiment, two or more light level thresholds may be utilized with additional color settings such that control device 100 may transition over a plurality of colors depending on light level conditions.

Referring to FIG. 9, there is shown a flowchart 900 illustrating the steps of the operation of the control device 100 for each button zone 415*a-e* based on the color and intensity settings of the backlight LEDs 311*a-e*. For clarity and illustrative purposes, the below description describe the steps of FIG. 9 with reference to the upper most button 102*a* associated with LEDs 311*a* in button zone 415*a*. In step 902, the control device 100 receives a light level reading (I) from the light sensor 317. In step 904, the control device 100 determines if the LEDs 311*a* of button 102*a* are in indication or backlight mode. If the LEDs' 311*a* are in indication mode, then in step 906 the control device 100 determines whether the received light level reading (I) from the light sensor 317 is smaller than the day/night threshold ($I_{th}$) 1005. If so, in step 908, the controller selects the color setting 1021 and the dimming curve 1001 of the indication-night mode. If instead the received light level reading (I) from the light sensor 317 is equal to or larger than the day/night threshold ($I_{th}$) 1005, then in step 910 the controller selects the color setting 1022 and dimming curve 1002 of the indication-day mode. If in step 904, the control device 100 instead determined that the LEDs 311*a* of button 102*a* are in a backlight mode, then in step 912 the control device 100 determines whether the received light level reading (I) from the light sensor 317 is smaller than the day/night threshold ($I_{th}$) 1005. If the LEDs 311*a* are in a backlight mode and the received light level reading (I) is smaller than the day/night threshold ($I_{th}$) 1005, then in step 914 the controller selects the color setting 1023 and the dimming curve 1003 of the backlight-night mode. If the received light level reading (I) from the light sensor 317 is equal to or larger than the day/night threshold ($I_{th}$) 1005, then in step 916 the controller selects the color setting 1024 and dimming curve 1004 of the backlight-day mode.

Then in step 918, the control device 100 determines the LED intensity level using received sensor light level reading (I) and the selected dimming curve. For example, using the slope and intercept formulas discussed above, the control device 100 may determine the LED intensity levels for the various selected modes using the following formulas:

Dim_Intensity_Indication-Day=(Slope_Indication-Day*Sensor_Reading)+Offset_Indication-Day Dim_Intensity_Backlight-Day=(Slope_Backlight-Day*Sensor_Reading)+Offset_Backlight-Day Dim_Intensity_Indication-Night=(Slope_Indication-Night*Sensor_Reading)+Offset_Indication-Night Dim_Intensity_Backlight-Night=(Slope_Backlight-Night*Sensor_Reading)+Offset_Backlight-Night According to an embodiment, the above determined LED intensity levels may be rescaled or remapped from a value off of a linear curve to a value off of a logarithmic curve. For example, referring to FIG. 10, these determined LED intensity values may be rescaled to substantially follow logarithmic curves 1031 and 1032. This can be accomplished using a mapping function and a table, a conversion formula, or the like. Although according to another embodiment, the dimming curves determined in step 822 in FIG. 8 may be already in a logarithmic form, instead of a linear form.

Then in step 920, the control device 100 drives the LEDs 311*a* using the selected color setting and the determined LED intensity level. Particularly, for each LED emitter color of LEDs 311*a*, the control device 100 may determine the pulse width modulation (PWM) intensity at which to drive the respective LED emitter color based on a selected color and the determined intensity value. For example, the control device 100 may use substantially the same systems and methods to drive the LED's 311*a-e* described in U.S. application Ser. No. 16/787,935, filed on Feb. 11, 2020, and titled "LED Button Calibration for a Wall Mounted Control Device", the entire disclosure of which is hereby incorporated by reference.

The control device 100 then returns to step 902 to determine whether to change its operation mode.

INDUSTRIAL APPLICABILITY

The disclosed embodiments provide an apparatus, system, and method for an automatic dimming and color adjusting backlight for wall mounted control device buttons. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted. For example, step 822 of FIG. 8 may be performed after steps 906 and 912 in FIG. 9. In addition, step 904 may be performed after steps 906 and 912 in FIG. 9.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A system for providing backlighting or light indication comprising:

at least one controller adapted to receive a day color setting, a night color setting, a minimum intensity setting, and a maximum intensity setting, and determine at least one dimming curve using the minimum intensity setting and the maximum intensity setting, wherein the at least one dimming curve is represented by a relationship between light level readings and intensity levels; and a lighting load control device comprising at least one button associated with at least one LED, a light sensor adapted to detect light and output light level readings, and a memory comprising a day/night light level threshold, wherein the lighting load control device:

drives the at least one LED at the night color setting when the received light level reading is below the day/night light level threshold;

drives the at least one LED at the day color setting when the received light level reading is above the day/night light level threshold; and drives the at least one LED at an intensity level determined using a light level reading received from the light sensor and the at least one dimming curve.

2. The system of claim 1 further comprising a user interface adapted to receive the day color setting, the night color setting, the minimum intensity setting, and the maximum intensity setting from a user.

3. The system of claim 1 further comprising a user interface adapted to receive the day/night light level threshold from a user.

4. The system of claim 1, wherein the at least one controller further determines the day/night light level threshold as a function of the minimum intensity setting, the maximum intensity setting, or a combination thereof.

5. The system of claim 1, wherein the at least one dimming curve comprises a night dimming curve and a day dimming curve.

6. The system of claim 1, wherein the at least one dimming curve comprises an indication-night mode dimming curve associated with the night color setting, an indication-day mode dimming curve associated with the day color setting, a backlight-night mode dimming curve associated with a second night color setting, and an backlight-day mode dimming curve associated with a second day color setting.

7. The system of claim 6, wherein the lighting load control device further:

drives the at least one LED at the night color setting and at an intensity level determined using the indication-night mode dimming curve during an indication state and when the received light level reading is below the day/night light level threshold;

drives the at least one LED at the day color setting and at an intensity level determined using the indication-day mode dimming curve during the indication state and when the received light level reading is above the day/night light level threshold;

drives the at least one LED at the second night color setting and at an intensity level determined using the backlight-night mode dimming curve during an idle state and when the received light level reading is below the day/night light level threshold; and drives the at least one LED at the second day color setting and at an intensity level determined using the backlight-day mode dimming curve during the idle state and when the received light level reading is above the day/night light level threshold.

8. The system of claim 6, wherein the at least one controller further determines the indication-night mode dimming curve and the indication-day dimming curve using the minimum intensity setting and the maximum intensity setting, and wherein the controller determines the backlight-night mode dimming curve and the backlight-day mode dimming curve using a second minimum intensity setting and a second maximum intensity setting.

9. The system of claim 8, wherein the at least one controller determines the second minimum intensity setting by subtracting a first predetermined intensity level or ratio from the minimum intensity setting and wherein the at least one controller determines the second maximum intensity setting by subtracting a second predetermined intensity level or ratio from the maximum intensity setting.

10. The system of claim 1, wherein the at least one dimming curve comprises at least one selected from the group consisting of a linear curve, a logarithmic curve, an exponential curve, an irregular curve, and any combinations thereof.

11. The system of claim 1, wherein the relationship between light level readings and intensity levels comprises at least one selected from the group consisting of a lookup table, a function, a mapping function, a conversion formula, a slope, an equation, and any combinations thereof.

12. The system of claim 1, wherein the lighting load control device is further adapted to drive a lighting load connected to the load control device using the received light level reading.

13. The system of claim 1, wherein the at least one LED comprises a red emitter color, a green emitter color, and a blue emitter color.

14. The system of claim 13, wherein the at least one LED further comprises a white emitter.

15. The system of claim 1, wherein the lighting load control device comprises the at least one controller.

16. The system of claim 1, wherein a mobile device comprises the at least one controller.

17. A system for providing backlighting or light indication for a lighting load control device comprising:

at least one button associated with at least one LED;

a light sensor adapted to detect light and output light level readings;

a memory comprising a day/night light level threshold; and at least one controller that:

receives a day color setting, a night color setting, a minimum intensity setting, and a maximum intensity setting;

determines at least one dimming curve using the minimum intensity setting and the maximum intensity setting, wherein the at least one dimming curve is represented by a relationship between light level readings and intensity levels;

drives the at least one LED at the night color setting when the received light level reading is below the day/night light level threshold;

drives the at least one LED at the day color setting when the received light level reading is above the day/night light level threshold; and drives the at least one LED at an intensity level determined using a light level reading received from the light sensor and the at least one dimming curve.

18. A system for providing backlighting or light indication comprising:

at least one controller that receives a day color setting, a night color setting, a minimum intensity setting, and a maximum intensity setting, and determines a day dimming curve and a night dimming curve using the minimum intensity setting and the maximum intensity setting, wherein the day dimming curve and the night dimming curve are each represented by a relationship between light level readings and intensity levels; and a lighting load control device comprising at least one button associated with at least one LED, a light sensor adapted to detect light and output light level readings, and a memory comprising a day/night light level threshold, wherein the lighting load control device:

drives the at least one LED at the night color setting and an intensity level determined using the night dimming curve when the received light level reading is below the day/night light level threshold; and drives the at least one LED at the day color setting and an intensity level determined using the day dimming curve when the received light level reading is above the day/night light level threshold.

19. A lighting load control device comprising:

a memory storing a day/night light level threshold, a day color setting, a night color setting, and at least one dimming curve represented by a relationship between light level readings and intensity levels, wherein the at least one dimming curve is determined using a minimum intensity setting input and a maximum intensity setting input;

at least one button associated with at least one LED;

a light sensor adapted to detect light and output light level readings; and a controller that:

drives the at least one LED at the night color setting when the received light level reading is below the day/night light level threshold;

drives the at least one LED at the day color setting when the received light level reading is above the day/night light level threshold; and drives the at least one LED at an intensity level determined using a light level reading received from the light sensor and the at least one dimming curve.

20. A method for providing backlighting or light indication to a lighting load control device having at least one button associated with at least one LED, a light sensor adapted to detect light and output light level readings, and a memory comprising a day/night light level threshold, the method comprising the steps of:

receiving a day color setting, a night color setting, a minimum intensity setting, and a maximum intensity setting;

determining at least one dimming curve using the minimum intensity setting and the maximum intensity setting, wherein the at least one dimming curve is represented by a relationship between light level readings and intensity levels;

driving the at least one LED at the night color setting when the received light level reading is below the day/night light level threshold;

driving the at least one LED at the day color setting when the received light level reading is above the day/night light level threshold; and driving the at least one LED at an intensity level determined using a light level reading received from the light sensor and the at least one dimming curve.

* * * * *